Dec. 28, 1954
R. S. ARMSTRONG
2,697,872
TUBE PULLING DEVICE
Filed Oct. 5, 1950
3 Sheets-Sheet 1
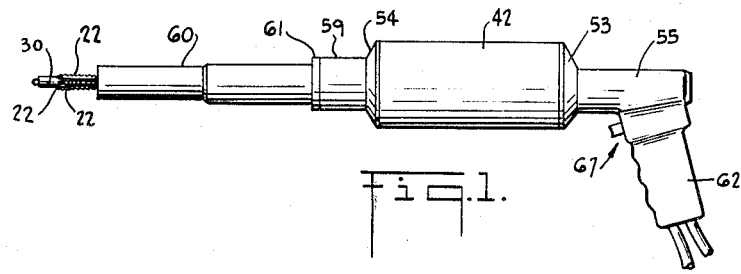
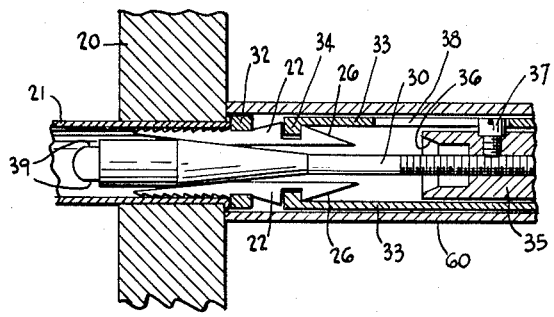
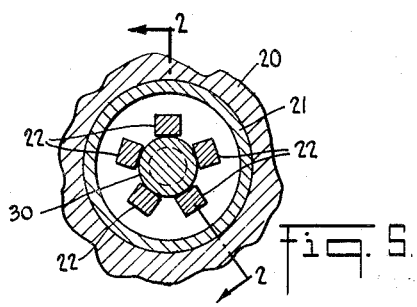
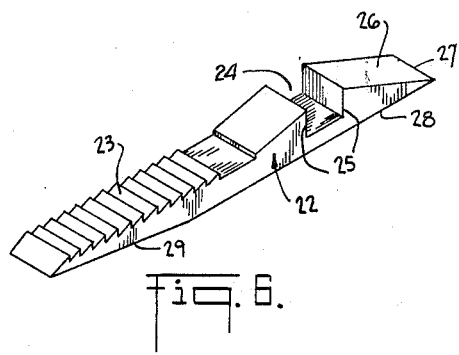
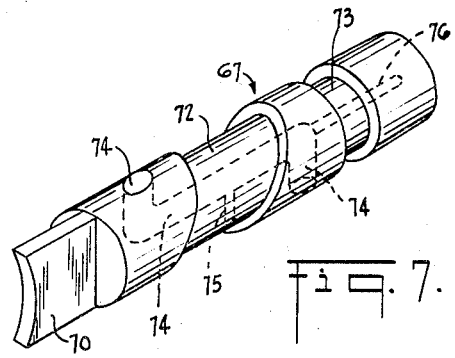
INVENTOR.
ROBERT S. ARMSTRONG
BY
Frederick Breitenfeld
ATTORNEY Dec. 28, 1954
R. S. ARMSTRONG
2,697,872
TUBE PULLING DEVICE
Filed Oct. 5, 1950
3 Sheets-Sheet 2
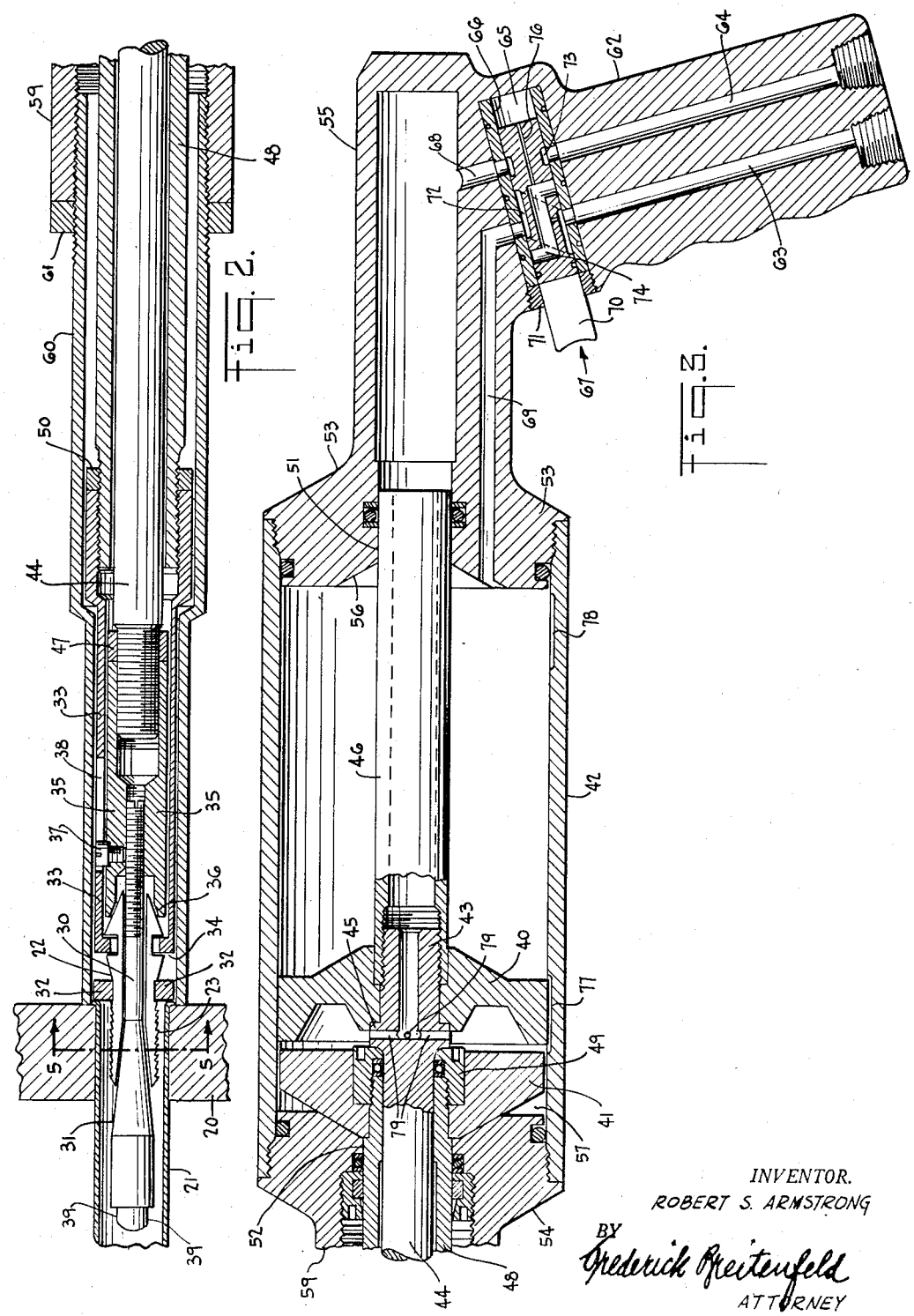
INVENTOR.
ROBERT S. ARMSTRONG
BY Frederick Breitenfeld
ATTORNEY

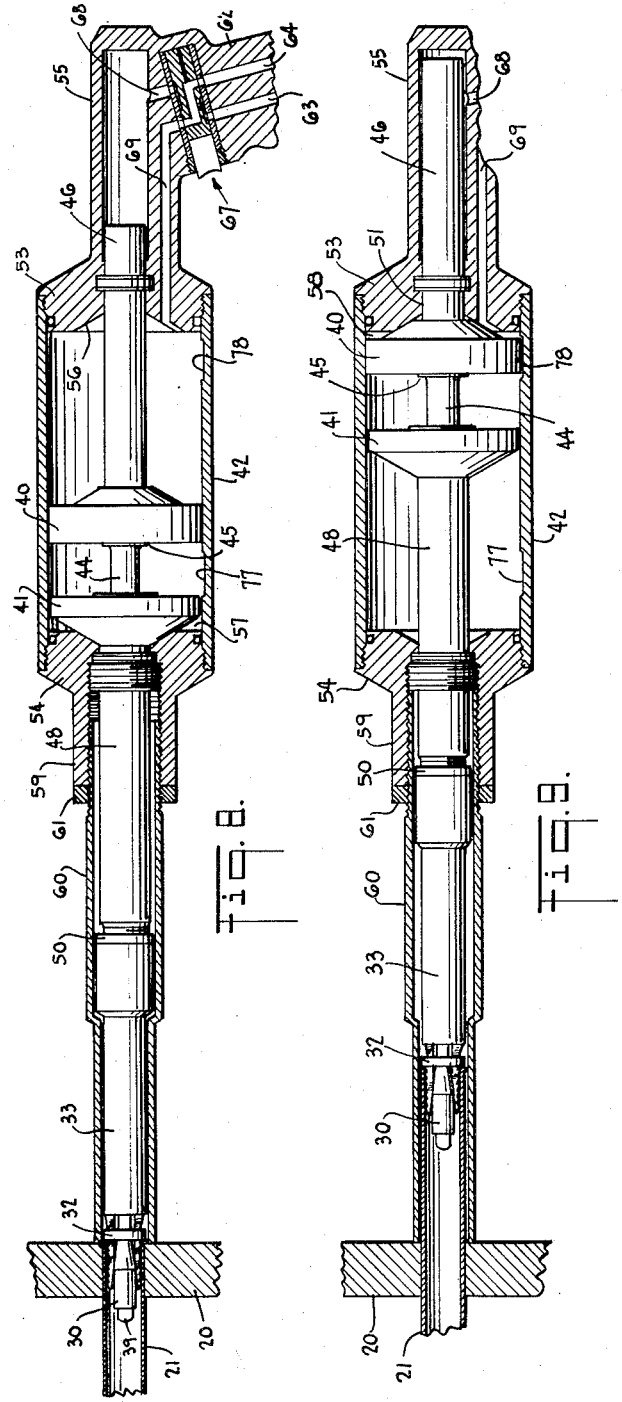

United States Patent Office 2,697,872
Patented Dec. 28, 1954

2,697,872

TUBE PULLING DEVICE

Robert S. Armstrong, Leonia, N. J.

Application October 5, 1950, Serial No. 188,509

5 Claims. (Cl. 29—252)

This invention relates generally to tools, and has particular reference to a tool or device of the type illustrated and described in U. S. Patent 1,964,023, for pulling tubes from a tube sheet.

It is a general object of the invention to provide a number of structural innovations which make the tool more compact, lighter in weight, easier to manipulate, more efficient, and more fully automatic.

The device is intended primarily for the removal of tubes from a surface condenser or similar heat exchanger, whose multiplicity of tubes require periodic replacement. Usually, such tubes are arranged in a parallel group supported at their ends by tube sheets. When the tubes corrode or become otherwise worn out, a tool of the present type is inserted into the ends of successive tubes, and after engaging each tube on the inside it functions to apply a pulling force to the tube and to yank it outwardly and thereby initiate its withdrawal.

The device comprises a claw insertable into the tube to be pulled, and an exteriorly controllable means for successively effecting an engagement of the tube by the claw, a withdrawal of the engaged tube, and a release of the tube by the claw. The term "claw" is intended to refer broadly to a plurality of grippers or biting elements, or their equivalents, and it is one of the particular objects of the present invention to improve the design and mounting of these biting elements to effect a firmer and more reliable grip upon the interior surface of the tube.

In the functioning of a tool of this kind, it has always been a problem to effect an efficient engagement with the interior of the tube to be pulled, because the greater the force with which the claw presses outwardly on the tube wall the more firmly is the tube pressed into the tube sheet from which it is to be loosened. It is one of the specific objectives of the present invention to provide an improved tube gripping claw which effects a firmer tube engagement with an expenditure of less force. I achieve this desirable result by means of a series of grippers which are mounted for free translational movements, as distinguished from pivoted movements, and providing the grippers with tube biting faces which are straight and which extend lengthwise in parallel relation so that when the grippers are moved radially outward to engage the tube each face will bite along its entire length into the surface of the gripped tube.

Another of the improvements relates to the operating instrument at the rear end of the tool whereby a fluid under pressure is caused to bring about, in proper and rapid succession, a grasping of the tube, a pulling of the tube, and a release of the tube. A mechanism of this general type, designed to utilize compressed air or steam, is illustrated in Patent 1,964,023. The present invention involves a redesign and simplification of the mechanism in order drastically to reduce its size and weight, and to make its manipulation far simpler, speedier and more efficient. Whereas a tool of the kind illustrated in said earlier patent weighs about two hundred pounds and is correspondingly bulky and unwieldy requiring overhead supporting tackle to hold it, the present improved tool weighs no more than about twenty-five pounds and can be easily handled and maneuvered by a single operator. Similarly, whereas the cylinder of the older tool is almost eleven inches in diameter, and carries projecting valves and pipes, the present tool is less than four inches in diameter, and is devoid of exteriorly projecting parts except for a pistol grip and trigger which greatly facilitate its use.

I achieve the foregoing objects, and such other objects as may hereinafter appear or be pointed out, in the manner illustratively exemplified in the accompanying drawings, in which:

Figure 1 is a side elevation of a tube-pulling device embodying the features of the present invention;

Figure 2 is a longitudinal cross-section along line 2—2 of Figure 5 of the forward or tube-engaging end of the tool, showing the parts in the relation they assume when the tool is first inserted into the end of a tube to be pulled;

Figure 3 is a continuation of Figure 2, showing the rear or control end of the tool;

Figure 4 is a fragmentary view similar to the left-hand part of Figure 2, showing the elements as they function to grasp the tube;

Figure 5 is a fragmentary cross-sectional view substantially along line 5—5 of Figure 2;

Figure 6 is a perspective view of one of the grippers;

Figure 7 is a perspective view of the movable element of the control valve; and

Figures 8 and 9 are views similar to Figures 2 and 3, on a reduced scale, showing the successive relative positions of the various parts during one complete cycle of operations.

In Figures 2 and 4 I have shown an illustrative tube sheet 20 and a single tube 21 in process of being withdrawn. It will be understood that many hundred tubes are arranged in parallel relationship with their ends mounted in the tube sheet 20, and that the description herein contained with respect to the single tube 21 is merely illustrative of the procedure that takes place with each tube.

Arranged in a circumferential series near the forward or tube-gripping end of the tool are a plurality of grippers. I prefer to use five of them at angularly spaced distances of about 72° (see Fig. 5) but any suitable fewer or greater number of grippers may be employed if desired.

Each gripper 22 (see Fig. 6) is an elongated element of adequately hardened metal having a substantially rectangular cross-sectional shape. It has at its forward end an outwardly facing tube biting face 23 which has a toothed or otherwise suitably roughened contour. This face as a whole lies in a substantially straight longitudinal direction, parallel to the longitudinal axis of the gripper. Rearwardly of the tube biting face 23 the gripper is provided with a transverse groove 24 whose front and rear walls 25 constitute abutment shoulders by means of which the gripper is guided and limited in its movements, as will be presently described. To make the groove 24 of adequate depth, the gripper may be enlarged in height at this region, as shown. Rearwardly of the groove 24, the outer surface 26 of the gripper tapers inwardly toward the rear end 27. The inner face 28 of the gripper is parallel to the longitudinal axis, and at its forward end it tapers outwardly as shown at 29. Thus the gripper may be said to have an internal taper at its forward end and an external taper at its rear end.

When the series of grippers are arranged circumferentially, as shown in Figure 5, the grooves 24 are in alignment and conjointly define an outwardly facing annular channel.

Extending axially through the group of grippers 22 is a rod 30 having a forwardly divergent conical camming surface 31 whose inclination is substantially the same as that of the internal tapers 29 on the grippers 22. Surrounding the grippers is an elastic ring 32, composed of rubber or the like, which engages them just rearwardly of the tube biting surfaces 23, and a tubular retaining member 33 having an inturned annular flange 34 which enters the annular channel defined by the grooves 24.

The flange 34 and the shoulders 25 of the gripper grooves 24 are interfitting parts which can move radially with respect to each other, and the shoulders 25 constitute abutments which prevent any appreciable movements of the grippers in an axial direction. Accordingly, the grippers are supported for free translational movements in radial directions, and gripping faces 23 are thus enabled to seat and adjust themselves flatwise against the interior surface of the tube 21 (compare Figs. 2 and 4) when the grippers as a group are moved radially outward.

The mechanism for controlling the radial movements of the grippers 22 is the rod 30 and the parts carried by it. As this rod is moved in a rearward direction, the camming surface 31 engages with the internal tapers 29 on the grippers 22 and forces them radially outward. To provide a means for returning the grippers toward the release position of Figure 2, the rod 30 is screw-threaded at its rear end to a tubular member 35 whose forward end 36 is internally tapered to engage with the external tapers 26 on the grippers 22 when the member 35 is moved forwardly.

The distance between the camming surfaces 31 and 36 can be regulated by screwing or unscrewing the rod 30 with respect to the member 35. This can be done from the front of the tool by applying turning force, by hand or wrench, to the flattened surfaces 39 at the front end of the rod 30. The parts can be locked in the selected relationship by the set-screw 37. A longitudinal slot 38 is provided in the retaining member 33 into which the head of the set-screw 37 projects, whereby access to this set-screw is available without dismantling the claw assembly. Adjustment of the distance between the camming surfaces 31 and 36 obviously controls the extent of claw movement for a given reciprocation of rod 30 and member 35.

This reciprocation relative to the claw assembly is controlled by the relative movements of two pistons at the rear end of the tool, a main piston 40 and an auxiliary piston 41, both pistons being arranged in a cylinder 42. It is the main piston 40 which is directly connected to the rod 30 and member 35. In assembling the parts, the piston 40 is applied forwardly to the rear end 43 of a piston rod 44. It abuts against a flange 45 formed on the rod 44 and is held in position by a rear piston rod extension 46 which is screw-threaded to the rear end 43 of the piston rod 44. At its forward end, the piston rod 44 is screw-threaded to the rear end of the member 35, and a lock nut 47 is advantageously employed in this connection.

The auxiliary piston 41 is mounted upon the rear end of a hollow piston rod 48 which encloses the piston rod 44. The piston 41 abuts forwardly against a shoulder on this rod and is held in position by a ferrule 49. The piston 41 is always positioned in front of the flange 45, and in their closest positional relationship the pistons 40 and 41 are thus slightly spaced apart as shown in Figure 3. The hollow piston rod 48 is screw-threaded at its front end to the rear end of the retaining member 33, and a lock-nut 50 is used to hold the parts in the desired relationship.

The construction purposely provides for relative movement of the pistons 40 and 41, and this relative movement is limited in extent. In coming together, the pistons cannot approach each other beyond the proximity shown in Figure 3, because of the abutment of the ferrule 49 rearwardly against the piston rod flange 45. In moving apart, the relative piston movement is limited by the abutment of the lock-nut 47 rearwardly against the front end of the hollow piston rod 48. For adjustment or regulating purposes, if the separational movement of the pistons is to be increased or decreased, this can be done by adjusting either the connection between member 35 and piston rod 44, or between member 33 and piston rod 48.

Because of the relative movability of the pistons, hence of their respective piston rods, it is desirable to provide expedients for preventing leakage of operating fluid between the piston rods 44 and 48, and elsewhere. For this purpose suitable packing rings, so-called O-rings, and equivalent means have been provided for wherever necessary. Since such expedients are known per se they need not be described in detail. Suffice it to point out that the piston rod 44 slides within the piston rod 48, that the piston rod extension 46 slides within the bearing 51 at the rear end of the cylinder 42, and that the piston rod 48 slides within the bearing 52 at the front end of the cylinder 42.

The cylinder 42 may be formed of a cylindrical sleeve part, as shown, screw-threaded at its opposite ends to the housing parts 53 and 54 respectively.

The part 53 at the rear is provided with the bearing 51 and with the elongated axial extension 55 into which the rod 46 projects when it is moved rearwardly.

The forward face of the part 53 has a central conical recess 56 into which the cone-shaped rear surface of the piston 40 fits when moved to its rearmost position. The cylinder part 54 has a similar conical recess adapted to receive the cone-shaped front surface of the auxiliary piston 41 when the latter is moved to its foremost position. The parts are so designed that when the auxiliary piston 41 is in its foremost position see Figs. 3 and 8) there is an annular space 57 between the forward end wall of the cylinder and the piston 41; and when the main piston 40 is in its rearmost position (see Fig. 9) there is a similar annular space 58 between the rear end wall of the cylinder and the piston 40.

Projecting forwardly from the cylinder part 54 is a threaded neck 59 (see Fig. 2) which is screwed onto the rear end of the elongated sheath 60. By adjusting the threaded engagement between these parts, and by employing the lock-nut 61 to secure them in selected relationship, the effective length of the sheath 60 may be varied. The forward end of this sheath is adapted to bear against the tube sheet 20, thereby fulfilling a dual function, viz., to limit the extent of insertion of the claw into the tube 21, and to serve as a brace to permit an operating fluid to yank the claw and the gripped tube 21 outwardly with respect to the tube sheet 20.

At the rear end of the housing extension 55 it is provided with a lateral projection shaped as a pistol grip 62. Extending longitudinally through this grip are parallel fluid passages 63 and 64. They terminate in a transverse valve chamber 65, preferably cylindrical in cross-section and provided with a lining element 66 which is preferably of steel and accurately machined on its internal surface so as to cooperate properly with a plug valve 67 mounted therein for reciprocating movements.

Formed in the extension 55 and also communicating with the valve chamber 65 are the fluid passages 68 and 69. The passage 68 leads to a point near the rear end of the extension 55, while the passage 69 leads to the forward surface of the cylinder part 53, into the space 58 (see Fig. 9).

The valve 67 (Fig. 7) has a trigger part 70 of non-circular cross-section which slides within a plug 71 sealing the front end of the valve chamber 65. Rearwardly of the trigger the valve 67 has a relatively wide peripheral cut-out 72 extending obliquely, i. e., the part at the bottom of the valve lies nearer to the trigger than the part at the top. Spaced rearwardly from this cut-out is another peripheral cut-out 73, not so wide and extending in non-slanting direction around the valve. From the top surface of the valve in front of the cut-out 72 to the bottom surface of the valve behind the cut-out 72 is a Z-shaped port 74.

The cut-outs 72 and 73, and the port 74, are the main operating ports. In addition to these, there is a small auxiliary port 75 extending downwardly from port 74 to cut-out 72, and there is another small auxiliary port 76 extending rearwardly from port 74 to the rear face of the valve.

Before the operation of the valve and pistons is described, it should be noted that the cylinder wall 42 is provided near the front end with a small longitudinal by-pass recess 77 (Fig. 3) and is provided near the rear end with a similar small by-pass recess 78. It should also be noted that the piston extension 46 and piston part 43 are hollow, terminating at the front in four transverse ports 79 arranged at 90° intervals in the flange 45, and that the auxiliary piston 41 is loosely fitted into the cylinder so that a small space exists between it and the cylinder wall.

The working fluid for which the present tool is primarily intended is a liquid, such as oil, at a pressure of between 1500 and 3000 pounds per square inch. Hydraulic units having a closed circulating system, affording a feed line of fluid at this presure and an exhaust line for drawing such fluid back into the circuit, are currently available on the market and are known per se. Such a hydraulic pump set-up can be used with the present tool. It has not been shown in the present drawings. The fluid pressure supply line is connected to the end of the passage 63 and the exhaust line is connected to the end of the passage 64, and the tool is then ready for use. The operation is as follows:

Normally, the pistons are at the extreme forward end of the cylinder, as shown in Figure 3. Fluid under pressure is in the passage 63, in the cut-out 72 and passage 69, and in the cylinder 42 behind the main piston 40. It has also leaked around the piston 40 through the by-pass 77, and around the piston 41. Its only path of escape is through the ports 79, and through the hollow elements 43 and 46, thence through the passage 68, cut-out 73 and passage 64 to the exhaust end of the fluid system. The force pushing forwardly on piston 40 is greater than that acting rearwardly on piston 41, hence the pistons are at rest within the forward end of the cylinder. Moreover, the fluid under pressure is also behind the valve 67, having passed through auxiliary ports 75 and 76 to get there, and this serves as a yieldable means for normally retaining the trigger in its forwardly advanced position.

When the trigger is pressed, it initiates a succession of movements and operations which are automatically performed in predetermined sequence. At the outset, the valve cut-out 72 is shifted rearwardly so as to introduce fluid under pressure into the passage 68 and to establish a connection, via port 74, between passage 69 and the exhaust end of the system. Fluid thus enters the housing extension 55 and passes forwardly through elements 46 and 43, then through ports 79, into the space between the pistons. Pressure on the rear of piston 40 having been relieved, the immediate effect is to move the piston 40 rearwardly away from the piston 41, thereby bringing the parts into the relation shown in Figure 8. As hereinbefore mentioned, the extent of piston separation is limited by the abutment of the lock washer 47 rearwardly against the front end of the piston rod 48. This separation of the pistons draws the camming surface 31 rearwardly relative to the claw and thus spreads the tube grippers 22 in radially outward directions.

Presently, the pressure of the fluid on the forward face of auxiliary piston 41 manifests itself and moves both pistons, in separated relation, toward the rear. This continues until the elements assume the relationships shown in Figure 9. This joint rearward movement of the pistons causes a rearward movement of the claw (hence of the engaged tube 21) with respect to the tube sheet 20, it being recalled that the sheath 60 serves to brace the cylinder itself against the tube sheet 20.

To restore the parts to their normal positions, it is merely necessary to release the trigger 70. The fluid entering behind the valve 67 instantly throws the valve forward to its normal position, and this reestablishes the fluid connections hereinbefore described which force both pistons to the forward end of the cylinder in normal unseparated relationship. During this period, the withdrawn tube is released by the grippers 22, since the approach of the pistons toward each other causes the camming surface 36 to act upon the tapered rear ends of the grippers 22, thereby bringing about a retractive movement of the grippers.

In practice, a single operator is enabled to wield the tool without difficulty, supporting it with one hand and grasping the pistol grip and trigger with the other. He proceeds rapidly from tube to tube. In each case, he inserts the claw and merely presses the trigger. In a matter of seconds the tool effects engagement and withdrawal of the tube, the extent of withdrawal being equal to the distance traveled by the pistons during their movement from the position of Figure 8 to that of Figure 9. While the tube is still engaged, the operator himself pulls the tube a few inches further, and then releases it by releasing the trigger. Upon release of the trigger the parts are almost instantly restored to positions in readiness for the next insertion.

The parts may be constructed of any suitable materials, as may be desired. Preferably, the cylinder parts 53 and 54 and the auxiliary piston 41 are made of aluminum or other light-weight metal, while the main piston 40 and valve 67, and such other parts as are subject to wear, are made of bronze or the like.

While the invention is obviously not restricted to specific sizes and dimensions, it is illustrative of the compactness of the tool to state that a tool embodying the features of the invention and successfully operated in the manner described has an over-all length of no more than about 24 inches, a cylinder diameter of less than 4 inches, and a weight of only 25 pounds. The ability to use such a tool in confined spaces (in the water box itself, for example), to require only a single operator to wield it, and to obviate the necessity for overhead supporting gear and the like, are among the more obvious advantages of the invention.

In general, it will be understood that those skilled in the art will be enabled to make changes in many of the details herein described and illustrated without necessarily departing from the spirit and scope of the invention as expressed in the appended claims.

Having thus described my invention and illustrated its use, what I claim as new and desire to secure by Letters Patent is:

1. In a tube pulling device, a claw at the forward end of the device insertable into the tube to be pulled and comprising radially movable grippers, a cylinder coaxial with said claw, a pair of pistons mounted in said cylinder for relative movement and also for joint movement, a hollow piston rod secured to the forward piston and extending forwardly therefrom, means for securing said hollow piston rod to said claw, an inner piston rod secured to the rear piston and extending forwardly through said hollow piston rod, gripper spreading means at the forward end of said inner piston rod operable upon relative separation of said pistons to spread the grippers into tube gripping relation, a hollow piston rod extension secured to the rear piston and extending rearwardly therefrom, the part of the inner piston rod directly in front of the rear piston having radial ports communicating with the interior of said hollow extension, means for establishing communication between said hollow extension and a source of fluid under pressure and at the same time establishing communication between the space behind said pistons and an exhaust, whereby fluid introduced into said hollow extension will enter the space between said pistons and force them apart, abutments on said piston rods arranged to come into contact when the pistons are moved apart thus limiting the extent of separation of said pistons, and a restricted fluid passage around the periphery of the forward piston to allow said fluid to flow into the space in front of said forward piston whereby both pistons will move in spaced relation toward the rear of said cylinder.

2. In a tube pulling device, the combination of elements defined in claim 1, wherein said restricted fluid passage is defined by a forward piston which is undersize.

3. In a tube pulling device, the combination of elements defined in claim 1, wherein said communication-establishing means comprises a handle on said cylinder provided with parallel fluid passages, one being an inlet for fluid under pressure, the other being an exhaust, and an externally controllable valve carried by said handle and operable to selectively connect one of said passages with said hollow extension and the other with the space behind said pistons.

4. In a tube pulling device, the combination of elements defined in claim 1, wherein said communication-establishing means comprises a handle on said cylinder provided with parallel fluid passages, one being an inlet for fluid under pressure, the other being an exhaust, said handle being provided also with a valve chamber with which said fluid passages communicate and with a second set of fluid passages leading respectively from said valve chamber to said hollow extension and to the space behind said pistons, and an externally controllable plug valve mounted in said valve chamber for movement between two positions, said valve being provided with ports which connect said parallel fluid passages to said second set of passages, directly and in reverse, in the two positions of the valve respectively.

5. In a tube pulling device, the combination of elements defined in claim 1, wherein there is a cylinder extension into which said piston rod extension moves, said cylinder extension carrying a handle provided with fluid passages communicating respectively with the space behind said rear piston and with the interior of said cylinder extension, and a valve for introducing fluid under pressure through one of said passages and exhausting it through the other.

References Cited in the file of this patent

UNITED STATES PATENTS

| Number | Name | Date |
|---|---|---|
| 1,241,819 | Campbell | Oct. 2, 1917 |
| 1,483,818 | Lloyd | Feb. 12, 1924 |
| 1,902,571 | Mitchell | Mar. 21, 1933 |

(Other references on following page)

UNITED STATES PATENTS

| Number | Name | Date |
|---|---|---|
| 1,964,023 | Armstrong | June 26, 1934 |
| 2,036,665 | White et al. | Apr. 7, 1936 |
| 2,098,134 | Cook et al. | Nov. 2, 1937 |
| 2,246,954 | Schleinitz | June 24, 1941 |
| 2,282,556 | Bowen | May 12, 1942 |
| 2,497,489 | Coursen et al. | Feb. 14, 1950 |
| 2,542,305 | Brinen et al. | Feb. 20, 1951 |
| 2,569,504 | Thierry | Oct. 2, 1951 |

FOREIGN PATENTS

| Number | Country | Date |
|---|---|---|
| 367,139 | Great Britain | Feb. 18, 1932 |